(12) United States Patent
Geltinger et al.

(10) Patent No.: US 8,460,599 B2
(45) Date of Patent: Jun. 11, 2013

(54) METHOD AND APPARATUS FOR THE ECONOMICAL PRODUCTION OF PLASTIC CONTAINERS

(75) Inventors: Florian Geltinger, Neufahrn (DE); Andreas Brunner, Aufhausen (DE); Dieter Finger, Neutraubling (DE)

(73) Assignee: Krones AG, Neutraubling (DE)

( * ) Notice: Subject to any disclaimer, the term of this patent is extended or adjusted under 35 U.S.C. 154(b) by 750 days.

(21) Appl. No.: 12/630,480

(22) Filed: Dec. 3, 2009

(65) Prior Publication Data

US 2010/0090375 A1 Apr. 15, 2010

(30) Foreign Application Priority Data

Dec. 10, 2008 (DE) .......................... 10 2008 061 492

(51) Int. Cl.
  *B29C 49/78* (2006.01)
(52) U.S. Cl.
  USPC .......................................... 264/529; 264/40.3
(58) Field of Classification Search
  None
  See application file for complete search history.

(56) References Cited

U.S. PATENT DOCUMENTS

| | | |
|---|---|---|
| 6,918,754 B2 | 7/2005 | Albrecht |
| 7,320,586 B2 | 1/2008 | Storione et al. |
| 2004/0173949 A1* | 9/2004 | Storione et al. ............... 264/529 |

FOREIGN PATENT DOCUMENTS

| | | |
|---|---|---|
| CN | 101014458 | 8/2007 |
| DE | 3111925 | 10/1982 |
| DE | 4340290 | 6/1995 |
| DE | 4340291 | 6/1995 |
| DE | 102004014653 | 10/2005 |
| DE | 102004041973 | 1/2006 |
| DE | 102004044260 | 4/2006 |
| EP | 0754537 | 1/1997 |
| EP | 1276598 | 8/2005 |
| WO | 2005092594 | 10/2005 |
| WO | 2006024462 | 3/2006 |
| WO | 2006029584 | 3/2006 |

\* cited by examiner

*Primary Examiner* — Monica Huson
(74) *Attorney, Agent, or Firm* — Simpson & Simpson, PLLC (57) ABSTRACT

A method and an apparatus for the economical production of containers from thermoplastic material with a blow moulding machine (3) are disclosed. For shaping the containers at least one first pressure channel (21) is provided, supplying a first pressure. Likewise at least one second pressure channel (22) is provided, supplying a second pressure, wherein the first pressure is lower than the second pressure. The air in the first pressure compartment (21) is used for the pre-blowing or for other blowing steps of the containers. The air in the second pressure compartment (22) is used for the final blowing of the containers. The final blown containers are vented into the first pressure compartment (21). A control unit is provided which maintains an essentially constant pressure in the first pressure compartment during the pre-blowing and the venting into the first pressure compartment. A pressure level of the external pressure reservoir (20) can be adjusted accordingly.

9 Claims, 6 Drawing Sheets

METHOD AND APPARATUS FOR THE ECONOMICAL PRODUCTION OF PLASTIC CONTAINERS

CROSS REFERENCE TO RELATED APPLICATIONS

This patent application claims priority of German Patent Application No. DE 10 2008 061 492.0, filed on Dec. 10, 2008, the application is incorporated herein by reference in its entirety.

FIELD OF THE INVENTION

The present invention relates to a method for the economical production of containers from thermoplastic material.

The invention relates further to an apparatus for the economical production of containers from thermoplastic material.

BACKGROUND OF THE INVENTION

A blow moulding machine for the production of containers from thermoplastic material has been frequently described in the state of the art already, so that in the following description a discussion of a detailed embodiment of a blow moulding machine is not necessary. For the production of the containers from thermoplastic material a preform is used, which is pre-blown or contoured in a blow mould with positive pressure. The blow mould comprises at least two mould carrier halves pivoted on a common axis. By turning the blowing wheel round an axis the mould carrier halves are closed and the blowing process or the contouring of the containers is started at a certain point within the rotary motion of the blowing wheel. A mould carrier is disclosed for example in the European patent EP 1276 589 B1.

The European patent application EP 0754 537 A1 discloses the possibility of reusing the work fluid in a stretch blow moulding machine. In a stretch blow moulding machine various functional units are operated pneumatically. A high-pressure blowing air tank for extending said preform and an operation air tank for operating said various functional units are provided. The exhaust air circuit of the blow moulds is connected with the operation air tank. Thus part of the used blowing air can be used with the operation air tank for operating the various functional units.

The German patent application 43 402 90 discloses the multiple use of operation air. In an apparatus at least one functional unit is operated pneumatically. The operation is by main operation air supplied to the pneumatic functional element from a main operation air supply. In addition to the main operation air supply at least one supplementary operation air supply is used, which operates at a lower pressure level than the main operation air supply. After an operation of a pneumatic functional element with pressurized air from the operation air supply during a transitional phase a venting into the supplementary operation air supply is done. After the transitional phase the venting of the first pneumatic element is carried out against environmental pressure. A second pneumatical operation is supplied from the supplementary operation air supply.

The German patent application DE 43 402 91 A1 also discloses the multiple use of blowing air. The blowing air is used for shaping a container out of thermoplastic material. After an adjustment of temperature a preform is supplied to a blowing station comprising a blow mould for contouring the container. The preform is placed into the blow mould. The preform is extended with high pressure blowing air. At least one further pneumatic operation is carried out with low pressure air taken from a low pressure air supply. The low pressure air supply has a lower pressure level than the high pressure blowing air supply. After an expansion of the preform high pressure air flowing out of the shaped container held in the blow mould is supplied to the low pressure air supply during a transitional period. The pressure within the low pressure air supply is monitored in order to limit the maximum pressure provided for low pressure air. After a transitional period the container held in the blow mould is vented into the environmental air.

The German patent application DE 10 2004 014 653 A1 discloses a method and an apparatus for manufacturing an in particular heat resistant hollow body. The hollow body is shaped out of a heated preform of thermoplastic material in a contoured blow mould. The shaping is done by directing a first medium into the preform, the medium being stored in a first medium supply under pressure. This is referred to as the pre-blowing phase. The hollow body is final blown by more or less simultaneously stretching the hollow body and directing a second medium into the hollow body from a second medium supply under a higher pressure than the first medium supply. Finally, a third medium, stored in a third medium supply and cooled, is directed into the final blown container. This process is known as the rinsing phase.

The U.S. Pat. No. 7,320,586 B2 discloses an apparatus for the blow moulding of containers. The containers are preferentially bottles made out of a preform, wherein gas is directed into the containers and the gas in the containers is recovered. The apparatus comprises a device for supplying the gas under a first pressure and under a second pressure. A blow mould for shaping the container is also provided. The device also comprises means for the recovery of the gas up to a set pressure level within the container. Furthermore control means are provided which control the recovery unit and the adjustment unit, so that predefined manufacturing conditions are maintained.

The German patent application DE 31 119 25 A1 discloses a method and an apparatus for saving pressurized air, in particular in thermoforming machines. The pressurized air is used for impacting a shaping tool. The pressurized air used in the shaping process, previously released into the atmosphere, is now released in stages. This is done in such a way that the pressurized air still present after the shaping process is partly stored and subsequently supplied to various further loads via suitable valve control and corresponding conduits. By these measures relatively high energy savings are achievable with respect to the entire thermoforming machine.

The German patent DE 10 2004 041 973 B3 discloses air recycling in the blow moulding process. Containers are produced from thermoplastics, wherein a heated preform is pre-blown by supplying low pressure blowing air from a low pressure air supply and subsequently final blown by supplying high pressure blowing air. The high pressure blowing air flowing out of the final blown container is supplied to the low pressure air supply by a switch during a transitional period. Pressure monitoring of the low pressure air supply is provided. After the transitional period the container is vented against an environmental pressure. Control of the pressure of the low pressure air supply provides for a variation of the duration of the transitional period.

SUMMARY OF THE INVENTION

It is an object of the invention to provide rather an energy-efficient method for the production of containers from thermoplastic material.

The above object is achieved by a method for the economical production of containers out of thermoplastic material, comprising the following steps:

feeding a respective preform to a respective mould carrier of a blow moulding machine which has at least one pressure compartment of low pressure and at least one pressure compartment of high pressure, wherein the pressure in the pressure compartment of low pressure is lower than or equal to the pressure in the pressure compartment of high pressure;

applying at least one first pressure to the respective preform in the mould carrier for pre-blowing the containers;

carrying out a final blowing of the containers with at least one second pressure, which is supplied by the pressure compartment of high pressure and is higher than the first pressure;

guiding at least one part of a venting of the final blown containers into a pressure compartment of low pressure, wherein the pre-blowing and/or further blowing steps for the production of the containers proceed from the pressure compartment of low pressure; and maintaining an essentially constant pressure in the pressure compartment of low pressure with a control unit during the pre-blowing and/or further blowing steps and the venting and controlling a pressure level of an external unit in such a way that a maximum volume flow rate of the blowing medium is achieved from the pressure compartment of low pressure to the external unit.

It is a further object of the invention to provide an apparatus for the economical and energy-efficient production of a container from thermoplastic material.

The above object is achieved by the apparatus for the economical production of containers from thermoplastic material comprising: a blow moulding machine with a plurality of blow moulds for shaping the containers; at least one first pressure compartment which provides a first pressure; at least one second pressure compartment which provides a second pressure and the first pressure compartment has a lower maximum pressure than the second pressure compartment, wherein air in the first pressure compartment is used for pre-blowing or further blowing of the containers and wherein air in the second pressure compartment is used for final blowing of the containers; a venting of the final blown containers is conductable, at least in part, into the first pressure compartment, and the pre-blowing and further blowing steps of the containers are done from the first pressure compartment; a control unit which maintains an essentially constant pressure in the first pressure compartment during pre-blowing and during venting into the first pressure compartment and a pressure level of an external unit is connected with the first pressure compartment and is controllable in such a way that a maximum volume flow rate of the blowing medium from the first pressure compartment to the external unit is assured.

The method for the economical production of containers from thermoplastic material comprises placing a preform in a respective mould carrier of a blow moulding machine. The blow moulding machine comprises at least one first pressure compartment and at least one second pressure compartment, wherein the first pressure compartment can be connected with an external unit. According to an embodiment of the invention the blow moulding machine comprises a first pressure compartment, a second pressure compartment, and a third pressure compartment, from which the pressurized air for the various blowing steps is supplied. The first pressure compartment has a first maximum pressure which is lower than a second maximum pressure of the second pressure compartment, which in turn is lower than a third maximum pressure of the third pressure compartment. The external unit is connected with the first pressure compartment of low pressure via a pressure reservoir to compensate pressure surges. The pressure reservoir can be a container, a hose, or similar device.

For the sake of simplicity the following description refers to at least one first pressure compartment and at least one second pressure compartment. It is obvious to a person skilled in the art that the method of the invention and the apparatus of the invention can be applied in the case of more than two pressure compartments. First a first pressure is applied to the respective preform in the mould carrier, in order to pre-blow the preform. For the final blowing of the container a second pressure is supplied from the second pressure compartment, which is higher than the first pressure supplied from the first pressure compartment. The final blown containers can be vented into the first pressure compartment. The pressure for the pre-blowing of the containers is supplied from the first pressure compartment. In order to facilitate recycling of the air in the second pressure compartment of the containers, a control unit is provided which maintains an essentially constant pressure in the first pressure compartment during the pre-blowing and the venting. Likewise the pressure level in the external pressure reservoir is controlled accordingly.

The control unit comprises an internal controller which maintains a constant pressure level in the first pressure compartment. The first pressure level in the pressure compartment of low pressure is kept constant, wherein the duration of the resupply from the higher second pressure level to the lower pressure level is controlled.

Furthermore the control unit comprises an external controller, which reduces or compensates a pressure difference between the pressure level in the external pressure reservoir and the pressure level in the pressure compartment of low pressure, if the pressure in the first pressure compartment of low pressure falls below a first set pressure.

A predefined first pressure difference between the pressure in the first pressure compartment and a first set pressure is preferentially between 0.1 bar and 0.6 bar, if the pressure in the first pressure compartment falls below the first set pressure. The external controller also reduces a second pressure difference between the pressure and a second set pressure in the first pressure compartment of low pressure, if the pressure in the first pressure compartment of low pressure rises above the second set pressure. The predefined second pressure difference is preferentially between 0.5 bar and 0.9 bar.

Furthermore the control unit extends the venting time of the containers into the first pressure compartment of low pressure, if the pressure falls below the first set pressure by the first pressure difference. Likewise this time can be reduced, if the second set pressure is exceeded by the second pressure difference. Preferentially a difference between the first and the second set pressures is below 2 bar. It is also possible to combine the first set pressure and the second set pressure into one set pressure.

Furthermore the first pressure compartment of low pressure is connected with a pressure sensor. The first pressure compartment of low pressure is connected with the external pressure reservoir via a central air distributor. The external pressure reservoir is connected via a first valve with a first load and via a second valve with a second load. The first load is a compressor. The second load is a muffler releasing surplus pressure into the environment. It is also possible that the first load is a further system for the production and/or filling of containers, requiring pressurized air from the second pressure compartment or the first pressure compartment. It is of particular importance that a pressurized air generated in the system is used at other stations of a compressed air system or of a manufacturing system. The external pressure reservoir also buffers pressure surges generated by the system in blow moulding and in the transfer of pressurized air to the respective pressure compartments.

The pressure level required in the first pressure reservoir is generated by a respective dome overflow valve, which is controlled by a proportional valve.

The apparatus of the present invention is provided for the economical production of containers from thermoplastic material with a blow moulding machine. The blow moulding machine comprises plural blow moulds for shaping the containers. A first pressure channel is provided, supplying a first pressure. A second pressure channel is provided, supplying a second pressure. The first pressure is lower than the second pressure. The first pressure channel is connected with an external pressure reservoir. The air in the first pressure compartment is used for pre-blowing or for other blowing steps of the containers or for directing the air to an external unit. Although the following description restricts itself to the blowing steps of pre-blowing and final blowing, this shall not be considered a limitation of the invention. Further blowing steps that can be conducted with pressurized air are stretch blow moulding, operation of the stretching rod and/or an intermediate blowing step that can be carried out after the pre-blowing and before the final blowing.

The air in the second pressure compartment of high pressure is used for the final blowing of the containers. The final blown containers can be vented into the first pressure compartment of low pressure. The pre-blowing of the containers is done from this first pressure compartment of low pressure or from a further pressure compartment of low pressure. A control unit is provided which maintains an essentially constant pressure in the first pressure compartment of low pressure during the pre-blowing and the venting of the containers into the first pressure compartment of low pressure. Likewise a pressure level of the first pressure reservoir or of the external unit is controlled in such a way that a maximum volume flow rate of the blowing medium from the first pressure channel to the external unit is assured. The first pressure channel can be connected with the external unit via a pressure reservoir.

BRIEF DESCRIPTION OF THE DRAWING

In the following, embodiments will explain the inventive method and the inventive apparatus and their advantages in more detail with reference to the accompanying drawings.

DETAILED DESCRIPTION OF THE INVENTION

The following description relates to the blow moulding of containers of thermoplastic material and the pressurized air supply for blow moulding these containers. Using air for moulding the plastic containers and using a particular pressure for the pre-blowing and final blowing, respectively, of the plastic container is one of several possible embodiments. Depending on the specifications of the plastic container or the plastic bottle to be produced other parameters have to be chosen in order to achieve optimal results for the produced plastic containers. In the figures the same reference numeral is used for like elements or elements of like function.

Figure 1:
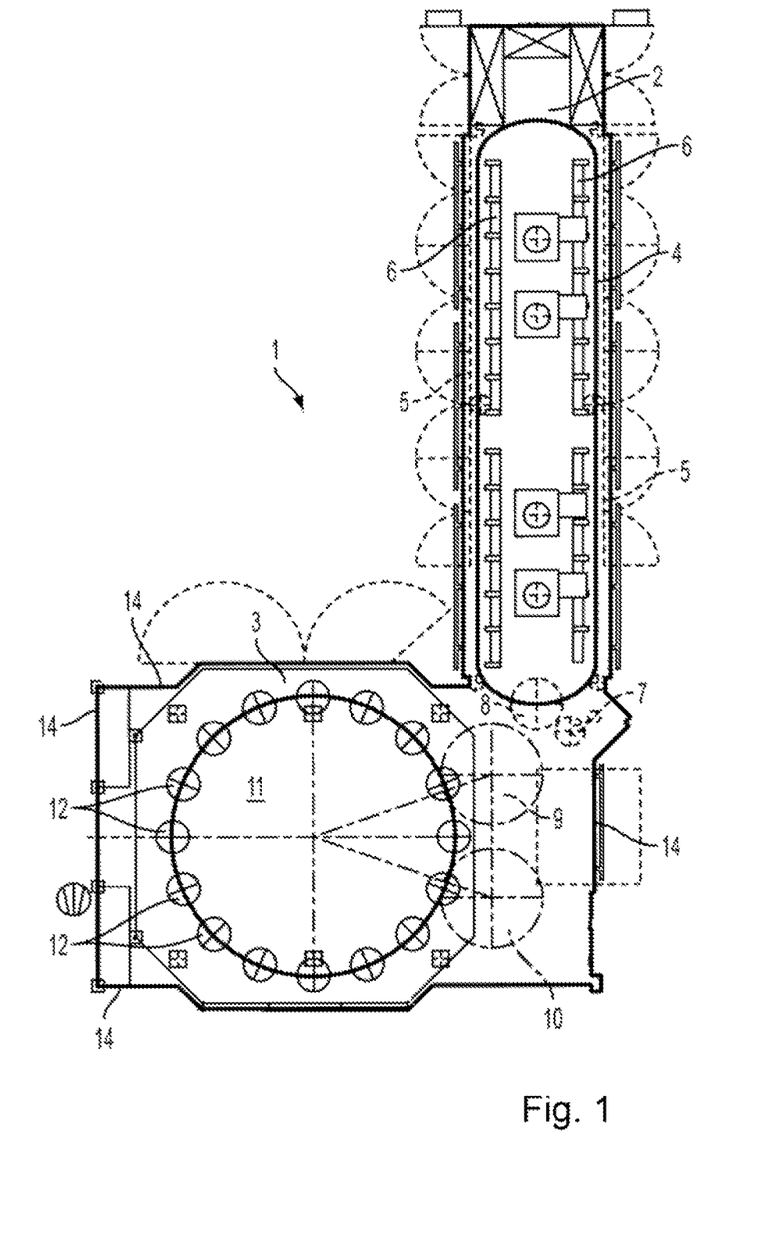
FIG. 1 shows a schematic view of a blow moulding machine connected with a furnace, which supplies the preforms to the blow moulding machine at a defined temperature for blow moulding of the plastic containers.

FIG. 1 shows a schematic view of an apparatus for the production of containers of thermoplastic material essentially by a stretch blow moulding process. In the following description the term 'plastic bottle' is used as a synonym of 'plastic container'. The apparatus 1 essentially consists of a furnace 2, in which preforms (not shown) for the plastic bottles to be produced are heated to a certain temperature so that the plastic bottles can be produced from these preforms by blow moulding or stretch blow moulding. A blow moulding machine 3 is connected with the furnace 2. In the furnace 2 there is provided a conveyor device 4, transporting a plurality of preforms past a heating device 5. The conveyor device 4 is shielded against the interior of the furnace 2 by heat reflecting tiles 6. The preforms enter the furnace 2 at a hand over point 7. At an exit point 8 the heated preforms are passed on to an entry point 9 of the blow moulding machine 3. At an exit point 10 of the blow moulding machine the moulded plastic containers are output for further processing or for filling (not shown).

In the representation of FIG. 1 the blow moulding machine 3 comprises a conveyor device 11 to which the plurality of mould carriers 12 is attached. In the schematic representation of the blow moulding machine 3 shown here the conveyor device 11 is a wheel. An essentially linear conveyor device is also conceivable. The blow moulding machine 3 is housed by several walls.

Figure 2:
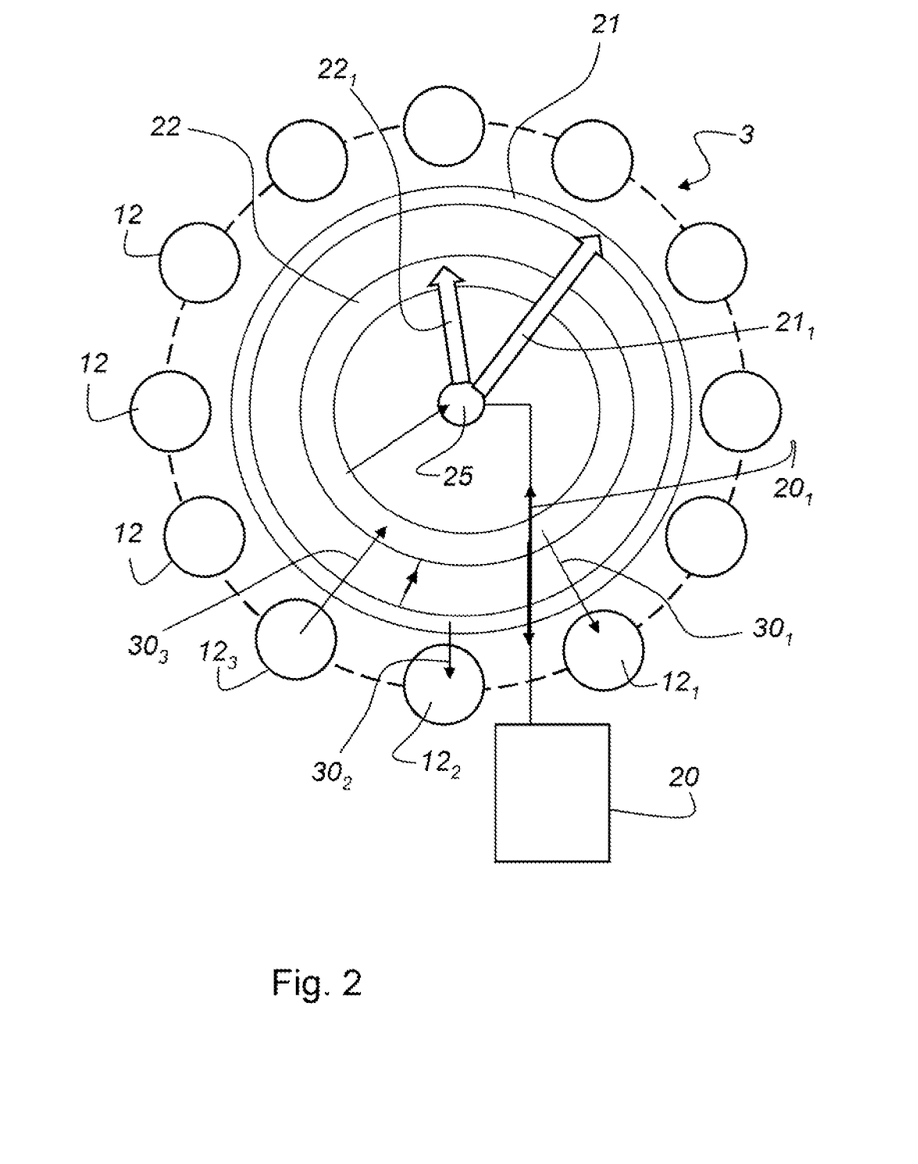
FIG. 2 shows a schematic view of the blow moulding machine with a first pressure compartment and a second pressure compartment and the pressure conduits required for blow moulding of the plastic containers.

FIG. 2 schematically shows the part of the blow moulding machine 3 which directs unused blowing/rinsing air out of the blow moulding machine into a load, for example a compressor. It is obvious to a person skilled in the art that any kind of load can be used. Outside the blow moulding machine 3 an external unit 20 is provided. The blow moulding machine 3 comprises a first pressure compartment 21 and a second pressure compartment 22. Likewise a central pressurized air distributor 25 is provided, supplied with the required pressurized air via the external unit 20. From the central pressurized air distributor 25 the first pressure compartment 21 is supplied with the required pressurized air via a conduit $21_1$. Likewise the second pressure compartment 22 is supplied with the corresponding pressurized air via a second conduit $22_2$. The pressure in the first pressure compartment 21 is lower than the pressure in the second pressure compartment 22.

Also shown in FIG. 2 is the blow moulding process of a plastic container, 2 0 wherein the arrows represent the directions of the flow of pressurized air during the blow moulding process. The blow moulding process is described in what follows with reference to three adjacent mould carriers $12_1$, $12_2$, and $12_3$. This is not to be considered a limitation of the invention. It is obvious to a person skilled in the art that the blow moulding process can extend over more than three positions of the mould carriers 12 during the rotation of the blowing wheel 3. As already ready shown above, pressurized air is supplied to the central pressurized air distributor 25 via the external unit. The pressurized air supply is indicated with the double arrow $20_1$. In the first pressure compartment 21 a pressure level is attained which is lower than the pressure level in the second pressure compartment 22. The pressurized air for pre-blowing the plastic containers is supplied to the mould carrier $12_1$ from the first pressure compartment 21. The path of the pressurized air is shown schematically in FIG. 2 by arrow $30_1$. In the further course of the blow moulding process the final blowing of the plastic containers is carried out, supplied from the second pressure compartment 22. The pressurized air supply of the corresponding mould carrier $12_2$ is represented in FIG. 2 by the arrow $30_2$. Finally the pressure level in the bottle is lowered for the final blowing to a level which essentially corresponds to the pressure level in the first pressure compartment 21. The surplus pressurized air from this process is, as indicated in FIG. 2 with the arrow $30_3$, directed from the container to the first pressure compartment 21. Should the pressure in the first pressure compartment 21 rise above or fall below a certain interval, the first pressure compartment 21 is vented into the main pressurized air supply which is ultimately connected with the external unit 20 that receives the surplus air or adjusts a required pressure or a required pressure level in the first pressure compartment 21. As can be seen from FIG. 2 the first pressure compartment 21 and the second pressure compartment 22 are respectively shaped as an annular channel, through which the necessary pressure is applied to the respective mould carriers 12 required for the blow moulding process. The pressure level in the external unit 20 is to be chosen thus that a maximum flow rate between the first pressure compartment 21 and the external unit 20 is achieved (large pressure difference), but that at the same time an evacuation of the first pressure compartment 21 related to a pressure drop in the first pressure compartment 21 is avoided.

Figure 3:
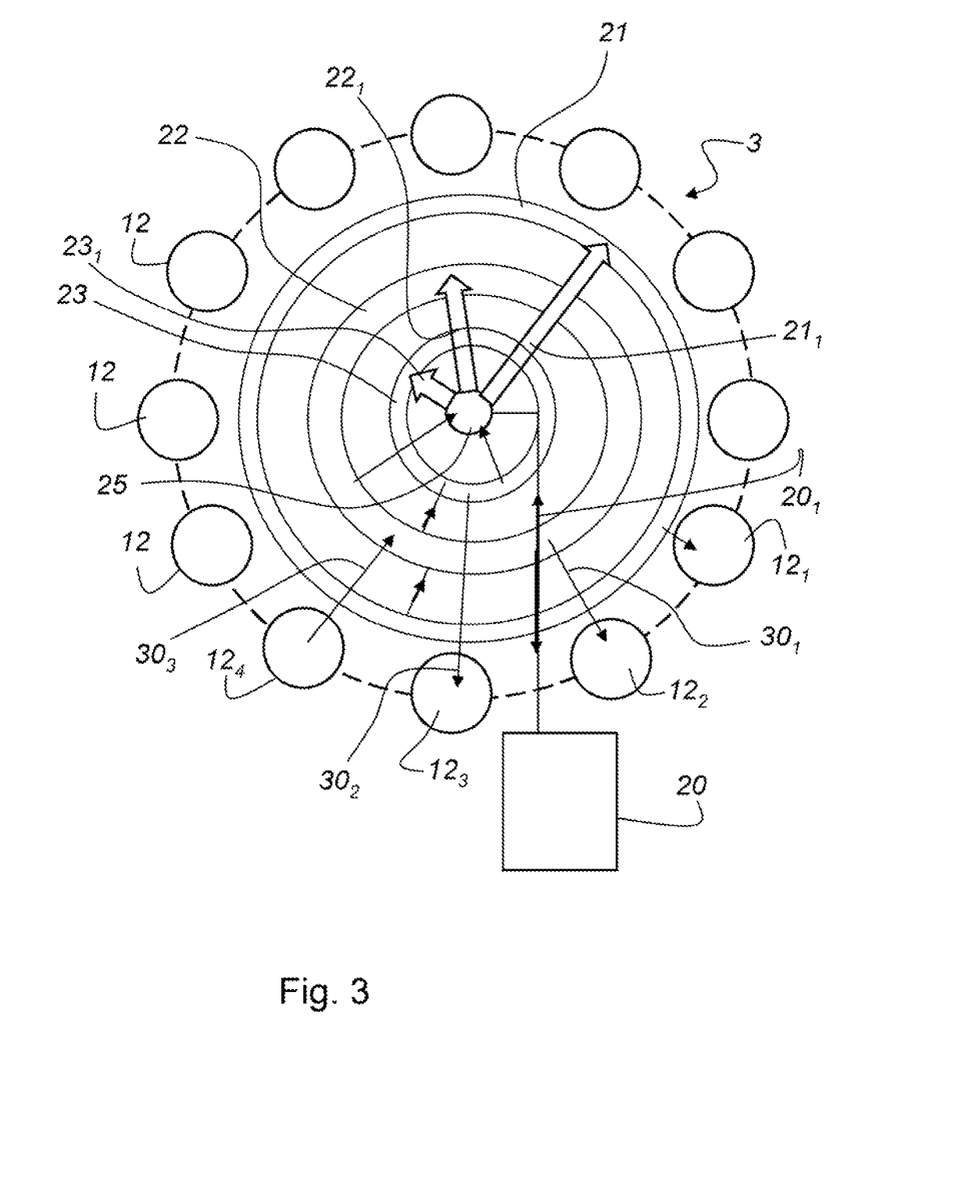
FIG. 3 shows a schematic view of a further embodiment of the blow moulding machine with a first pressure compartment, a second pressure compartment, and a third pressure compartment for blow moulding the plastic containers.

FIG. 3 shows a schematic representation of a second embodiment of the apparatus for the economical production of plastic containers. A first pressure compartment 21, a second pressure compartment 22, and a third pressure compartment 23 are provided, from which the pressurized air for the various blowing steps is supplied. The first pressure compartment 21 has a first maximum pressure which is lower than a second maximum pressure of the second pressure compartment 22. The third pressure compartment 23 has a maximum pressure which is higher than the maximum pressure of the second pressure compartment 22. As there are three pressure compartments, the blow moulding process is described with reference to four adjacent mould carriers $12_1$, $12_2$, $12_3$, and $12_4$. Pressurized air is supplied to the central pressurized air distributor 25 from the external unit 20. From the central pressurized air distributor 25 the pressurized air with the respective pressure level is directed via a first conduit $21_1$ into the first pressure compartment 21. Likewise the second pressure compartment 22 is connected with the central pressurized air distributor 25 via a second conduit $21_2$. Correspondingly the third pressure compartment 23 is connected with the central pressurized air distributor 25 via a third conduit $21_3$. Out of the first pressure compartment 21, the second pressure compartment 22, and the third pressure compartment 23 the pressurized air required for the respective blow moulding step is supplied to the mould carriers $12_1$, $12_2$, $12_3$, and $12_4$. A venting of one pressure compartment into a pressure compartment with a lower pressure level is conceivable. Preferentially with this embodiment the pre-blowing of the containers is done from the pressure compartment 21, afterwards an intermediate blowing step can be carried out from the second pressure compartment 22, and then the container is final blown from the third pressure compartment 23. After the final blowing the surplus pressure of the container, which can arise from a rinsing of the bottle amongst other things, is vented into a pressure compartment of lower pressure, preferentially into the second pressure compartment 22. This is indicated by arrow $30_3$. Via the link $21_1$ this air is resupplied to the external unit 20. The link $21_1$ consists of two conduits, wherein via the first the central pressurized air distributor 25 is supplied from the external unit, like for example a compressor, and wherein via the second conduit surplus air from the blow moulding machine is directed from a pressure compartment of low pressure 21, 22 to the external unit 20, where this surplus air can be reused for the pressure generation for the central air distributor 25. It is also conceivable that this second conduit is not connected with the external unit 20, but with another external unit that is not shown here.

Figure 4:
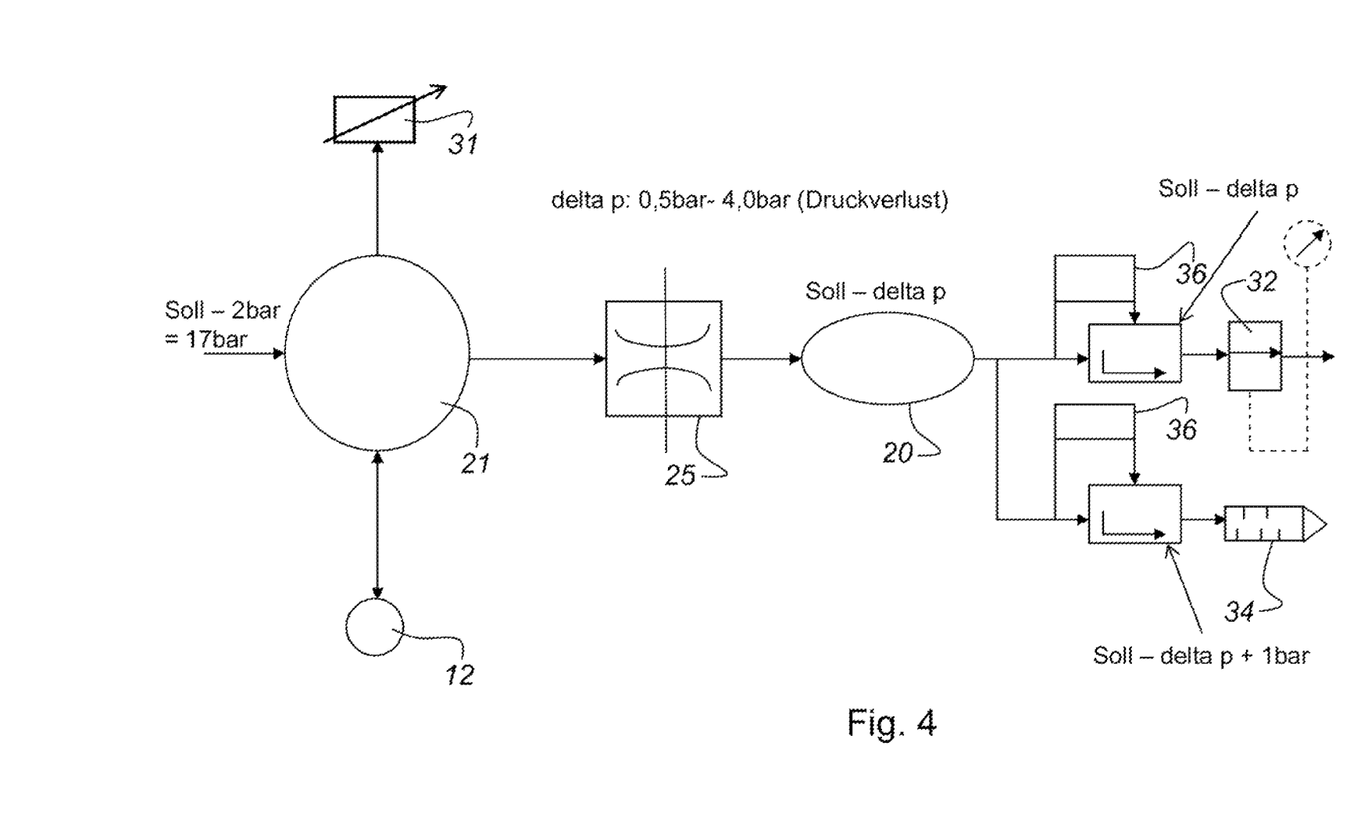
FIG. 4 shows a schematic representation of the pressure control flow chart for blow moulding the plastic containers.

FIG. 4 shows a schematic representation of the pressure control according to the invention for the first or second pressure compartment 21 or 22. Here it is important, as has already been mentioned, to maintain an as far as possible constant pressure level in the first pressure compartment 21 and to adjust the pressure level in the external pressure reservoir or the external unit 20, respectively, in such a way that a maximum flow rate is achieved, without incurring a or incurring only an as small as possible drop of the pressure level in the first pressure compartment. To this end the pressure in the external unit 20 is adjusted in such a way by lowering an external pressure or by raising the external pressure that a desired curve of the pressure rise or drop is achieved. Thus the volume flow rate of the blowing medium is controlled by adjusting the set pressure in the external unit. As already mentioned the first pressure compartment 21 is connected with a central air distributor or pressure distributor 25. Also there is a connection of the first pressure compartment 21 with the mould carriers 12, in which the plastic containers are contoured. The first pressure compartment is also connected with a pressure sensor 31, which measures the pressure in the first pressure compartment 21. It is indicated in FIG. 4 that the set pressure in the first pressure compartment 21 should vary by less than 2 bar. Thus the pressure level in the first pressure compartment 21 is about 17 bar. The first pressure compartment 21 is connected with the external pressure unit 20 or the external pressure reservoir, respectively, via the central air distributor 25. As already mentioned in the descriptions of FIGS. 2, 3, and 4, the entire supply of blowing air occurs via the central air distributor 25. For the resupply of air to the external unit 20 no additional valve is necessary for the mould carriers 12. The air is directly withdrawn from the central air distributor 25. From the external pressure reservoir 20 the air can be withdrawn via an artificial load 32. In addition to the artificial load 32 a compressor 34 is provided, which assures a constant withdrawal of air from the external pressure reservoir 20. The external unit 20 or the external pressure reservoir, respectively, has a certain volume in order to reduce the pressure pulsations from the blow moulding machine 3. The pressure level required in the external unit is generated by a dome over-flow valve 36, which is controlled by a proportional valve. The proportional valves thus are located before the artificial load 32 or the compressor 34, respectively.

Figure 5:
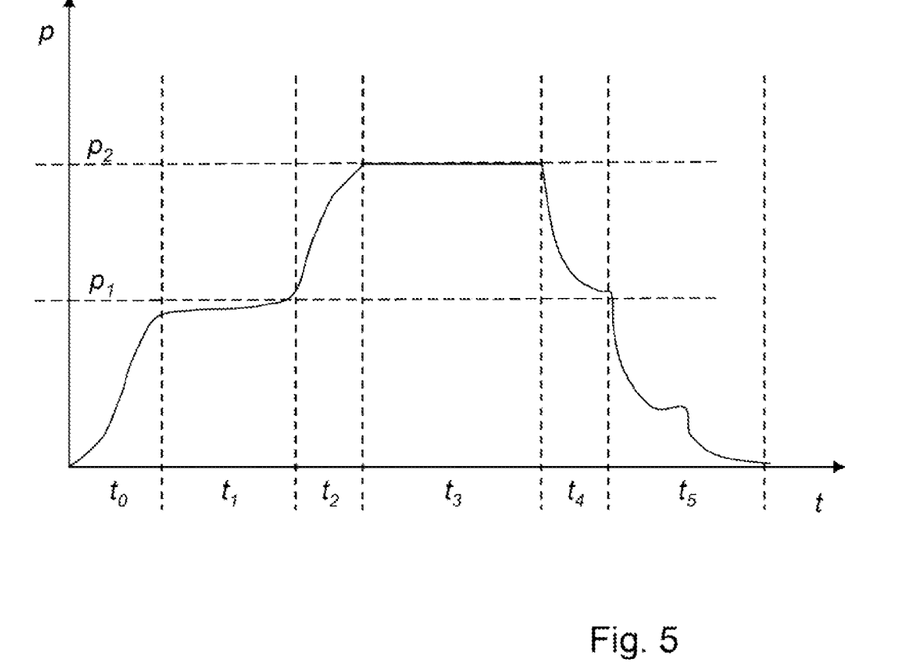
FIG. 5 shows a schematic representation of the pressure curve during the blow moulding of a container of thermoplastic material.

FIG. 5 schematically shows the pressure as a function of time for shaping a plastic container from thermoplastic material in a stretch blow moulding process. In this stretch blow moulding process a first pressure compartment 21 and a second pressure compartment 22 are used. First the pre-blowing of the plastic container is carried out for a certain time $T_1$. During this time $T_1$ a pressure $P_1$ is set. A certain time $T_0$ is required to reach the pressure level $P_1$ for the pre-blowing of the containers. Starting from the pressure level $P_1$ for the pre-blowing a certain time $T_2$ is required to reach the pressure level $P_2$ and to carry out the final blowing of the thermoplastic containers. The pressure level $P_2$ is maintained for a certain time $T_3$. After the time $T_3$ the rinsing process from the higher pressure level $P_2$ to the lower pressure level $P_1$ is initiated.

This rinsing process requires a time $T_4$. Afterwards, during a certain time $T_5$, the air still in the final blown container is vented to the environment. In order to achieve a sufficient supply with pressurized air for the pre-blowing, i.e. the pressure level $P_1$, or a corresponding flow of pressurized air form the pressure level $P_2$ to the pressure level $P_1$ for the rinsing process of the final blown plastic containers a control unit is provided so that a sufficient flow rate of pressurized air can be set and at the same time an evacuation of the first pressure compartment 21 avoided. According to the invention an internal controller (fast control circuit) is provided. This control device attempts to keep the set pressure $P_1$ in the first pressure compartment 21. This can be done for example by extending or shortening the duration $T_4$ for the rinsing from the second pressure level $P_2$ into the first pressure level $P_1$, put differently for the rinsing from the second pressure compartment 22 into the first pressure compartment 21. Furthermore an external controller (slow control circuit) is provided, which sets the pressure in the first pressure compartment 21 according to the required parameters. If the pressure in the first pressure compartment 21 is in the interval between 0.1 bar and 0.6 bar from the set pressure, the pressure difference (Delta P) between the pressure level in the external reservoir 20 and the pressure level in the first pressure compartment 21 is slowly raised, starting at 0 bar. At the same time the internal controller increases the duration $T_4$ or the recycling angle, with which the pressurized air from the second pressure compartment 22 reaches the first pressure compartment 21. If the pressure difference between the pressure and the set pressure in the first pressure compartment 21 increases to an interval between 0.5 bar and approximately 0.9 bar, which corresponds to a pressure drop, the pressure difference (Delta P) between the external pressure reservoir 20 and the first pressure compartment 21 is reduced again. At a stop or restart of the blow moulding machine 3 the control unit reuses the last control parameters, thus reducing the settling time. By changing the parameters, for example the pressure in the first pressure compartment 21, the control parameters are reset.

Figure 6:
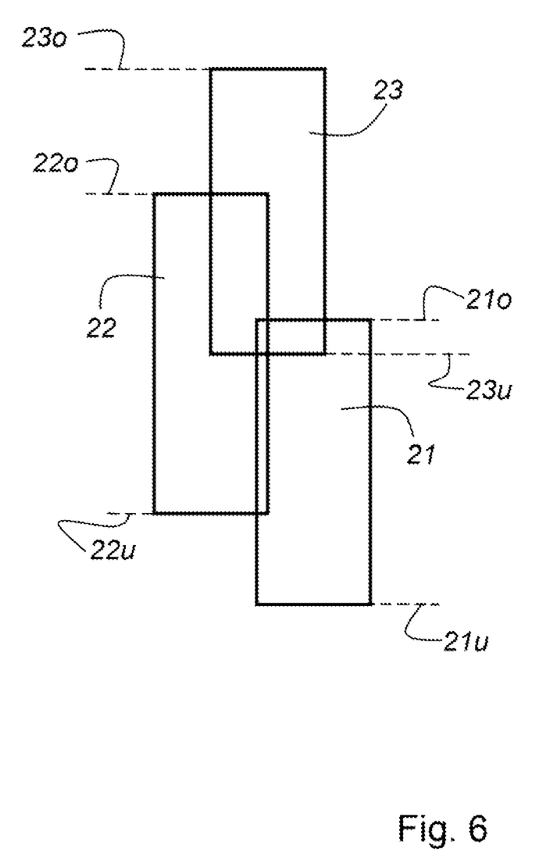
FIG. 6 schematically shows three pressure intervals and their partial overlap.

FIG. 6 shows the overlap of the pressure intervals of the first pressure compartment 21, the second pressure compartment 22, and the third pressure compartment 23. The first pressure compartment 21 has an upper pressure level 21o and a lower pressure level 21u. The upper pressure level 21o of the first pressure compartment 21 is so high that it lies within the pressure interval of the third pressure compartment 23. Likewise the lower pressure level 22u of the second pressure compartment 22 is within the pressure interval of the first pressure compartment 21. The upper pressure level 22o of the second pressure level 22 is within the pressure interval of the third pressure compartment and is above the upper pressure level 21o of the first pressure compartment 21.

The invention has been described with reference to preferred embodiments. It is obvious to a person skilled in the art that alterations and modifications of the invention can be made without leaving the scope of the subsequent claims.

What is claimed is:

1. A method for the economical production of containers out of thermoplastic material, comprising the following steps:
   feeding a respective preform to a respective mould carrier of a blow moulding machine which has at least one pressure compartment of low pressure and at least one pressure compartment of high pressure;
   supplying pressurized air from a central air distributor to the at least one pressure compartment of low pressure and the at least on pressure compartment of high pressure, wherein the pressure in the pressure compartment of low pressure is lower than or equal to the pressure wherein the pressure compartment of high pressure;
   applying at least one first pressure to the respective preform in the mould carrier for pre-blowing the containers;
   carrying out a final blowing of the containers with at least one second pressure, which is supplied by the pressure compartment of high pressure and is higher than the first pressure;
   guiding at least one part of a venting of the final blown containers into a pressure compartment of low pressure, wherein the pre-blowing and/or further blowing steps for the production of the containers proceed from the pressure compartment of low pressure; and
   maintaining an essentially constant pressure in the pressure compartment of low pressure with a control unit during the pre-blowing and/or further blowing steps and the venting and controlling a lowering or raising of a pressure level of an external unit in such a way that a desired curve of the pressure rise or drop is achieved as a function of time and wherein a volume flow rate of the blowing medium is controlled by adjusting the set pressure of the external unit.

2. The method of claim 1, wherein the control unit comprises an internal controller, which maintains a constant pressure level in the pressure compartment of low pressure, wherein the duration of the resupply from the high pressure level to the low pressure level is controlled.

3. The method of claim 1, wherein the control unit comprises an external controller which reduces a pressure difference between the pressure level in the external pressure reservoir and the pressure level in the pressure compartment of low pressure, if the pressure in the pressure compartment of low pressure falls below a first set pressure.

4. The method of claim 1, wherein the control unit comprises an external controller which increases a pressure difference between the pressure level in the external pressure reservoir and the pressure level in the pressure compartment of low pressure, if the pressure in the pressure compartment of low pressure rises above a second set pressure.

5. The method of claim 1, wherein the pressure compartment of low pressure is connected with the external unit via a central air distributor, wherein the external unit is connected with a further first load and a further second load via respective valves.

6. The method of claim 5, wherein the further first load is a compressor or a further pressure pipework for a system for the production and/or filling of containers.

7. The method of claim 5, wherein the further second load is a muffler, through which surplus pressure that is not converted in the further first load, is released into the environment.

8. The method of claim 1, wherein the pressure compartment of low pressure is connected with an external pressure reservoir.

9. The method of claim 1, wherein a first pressure compartment of low pressure, a second pressure compartment of low pressure, and a third pressure compartment of high pressure are provided, from which the pressurized air for the various blowing steps is supplied, and wherein the first pressure compartment of low pressure has a first maximum pressure, which is lower than a second maximum pressure of the second pressure compartment of low pressure, which in turn is lower than a third maximum pressure of the third pressure compartment of high pressure.

* * * * *